United States Patent
Altmeyer et al.

(10) Patent No.: US 6,863,758 B1
(45) Date of Patent: Mar. 8, 2005

(54) METHOD OF ASSEMBLING PLASTIC FILTER ELEMENT WITH PLASTIC CASING

(75) Inventors: Gerd Altmeyer, St. Ingbert (DE); Harald Mees, Lebach (DE); Herbert Mohr, Merchweiler (DE); Ute Lehmann, St. Ingbert (DE)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 0 days.

(21) Appl. No.: 09/446,523

(22) PCT Filed: Aug. 25, 1997

(86) PCT No.: PCT/EP97/04630

§ 371 (c)(1),
(2), (4) Date: Dec. 28, 1999

(87) PCT Pub. No.: WO99/10080

PCT Pub. Date: Mar. 4, 1999

(51) Int. Cl.[7] .............................. B32B 7/02; B23P 19/10
(52) U.S. Cl. .............................. 156/91; 29/525; 55/492; 55/521; 156/73.1; 156/218; 210/232; 210/457; 210/493.1; 210/497.3; 264/405
(58) Field of Search .................. 55/332, 336, 484–490, 55/492, 498, 521, 527; 29/525, 902; 156/73.1, 91, 217, 218, 244.15, 250, 294; 210/232, 337, 338, 488, 483–485, 493.1–493.5, 495, 497.01, 497.3, 500.27, 527, 459, 489; 264/405, 407, 442, 445

(56) References Cited

U.S. PATENT DOCUMENTS

| | | | |
|---|---|---|---|
| 3,200,953 A | * | 8/1965 | Komarmy .................. 210/457 |
| 3,241,680 A | * | 3/1966 | Humbert, Jr. |
| 3,457,339 A | * | 7/1969 | Pall et al. |
| 3,460,680 A | * | 8/1969 | Domnick |
| 3,560,131 A | * | 2/1971 | Yotsumoto |
| 4,154,688 A | * | 5/1979 | Pall ............................. 210/487 |
| 4,243,397 A | * | 1/1981 | Tokar et al. .................. 55/487 |

(List continued on next page.)

FOREIGN PATENT DOCUMENTS

| | | |
|---|---|---|
| DE | 43 12 705 A1 | 10/1994 |
| DE | 195 38 185 A1 | 4/1997 |
| EP | 0 213 930 A | 3/1987 |
| EP | 213-930 A2 * | 3/1987 |
| EP | 0 662 340 A1 | 7/1995 |
| GB | 1 411 607 | 10/1975 |
| GB | 2 007 992 A | 5/1979 |
| WO | 79/00978 | 11/1979 |

OTHER PUBLICATIONS

Hawley's Condensed Chemical Dictionary (Lewis, Richard J. Sr., 13th ed., pp. 498, 888 and 961).*

(List continued on next page.)

Primary Examiner—Joseph Drodge
(74) Attorney, Agent, or Firm—Roylance, Abrams, Berd, Berdo & Goodman L.L.P.

(57) ABSTRACT

A method of assembling a filter element includes the initial step of forming a plastic filter casing with openings from a flat blank with opposite ends thereof bent towards one another and joining these opposite ends together by a sealing seam. Also, a resilient mat filter is folded into a cylindrical shape and pushed open on a fluid-permeable supporting pipe to surround and engage the surrounding pipe. The cylindrical shape of the mat filter has an exterior diameter prior to introduction into the casing that is larger than an interior diameter of the filter casing along the entire axial length of the mat filter. The mat folder is folded into a conical shape to facilitate its introduction thereof into the filter casing. After the axial end is formed, the mat filter and supporting pipe are introduced into the filter casing to define a filter chamber. Finally, two end caps are joined to the filter casing.

16 Claims, 5 Drawing Sheets

U.S. PATENT DOCUMENTS

| | | | | |
|---|---|---|---|---|
| 4,244,820 A | * | 1/1981 | Hauk et al. | 210/194 |
| 4,609,465 A | * | 9/1986 | Miller | 210/484 |
| 4,767,426 A | * | 8/1988 | Daly et al. | |
| 4,929,354 A | * | 5/1990 | Meyering et al. | 210/321.61 |
| 4,956,089 A | * | 9/1990 | Hurst | 210/484 |
| 4,977,958 A | * | 12/1990 | Miller | |
| 5,431,706 A | * | 7/1995 | Paas | 55/342 |
| 5,472,606 A | * | 12/1995 | Steere et al. | 210/489 |
| 5,639,370 A | * | 6/1997 | Fall et al. | 210/489 |
| 5,855,783 A | * | 1/1999 | Shucosky et al. | 210/493.1 |

OTHER PUBLICATIONS

"Technical Guidelines for Identification and Environmentally Sound Management of Plastic Wastes and for Their Disposal" (Appendix 5, p. 11, paragraph 4).*

Technical Guidelines for Identification and Environmentally Sound Management of Plastics Waste and for its Disposal (UN Environment Programme, 18$^{th}$ session, Jun. 18–20, 2001), pp. 1, 8, 11 and 23–25.*

* cited by examiner

METHOD OF ASSEMBLING PLASTIC FILTER ELEMENT WITH PLASTIC CASING

This application is a 371 of PCT/EP97/04630 filed Aug. 25, 1997.

FIELD OF THE INVENTION

The present invention relates to a filter element comprising a supporting pipe surrounded by a mat filter. The mat filter is enclosed in a filter casing with openings delimiting a filter chamber. The filter element has two end caps arranged on the frontal surfaces.

BACKGROUND OF THE INVENTION

Filter elements disclosed in DE 4312705A1 serve generally to free polluted fluids of pollutants, especially fluids in the form of hydraulic power oil. Pollutants are intercepted by the mat filter of the filter element, and are retained and held out of the fluid current. When the mat filter is filled completely with pollutants, it is exchanged for a new mat filter or the complete filter element is replaced with an entirely new filter element. In this device, the polluted fluid passes through at least one of the two end caps through a corresponding inlet opening into the filter element, and flows through this element for a purification process occurring from the outside inward. For this purpose, the mat filter is arranged between the supporting pipe with openings and the filter casing likewise provided with openings. In order to attain a high pollutant intercepting capacity, the mat filter is pleated with a plurality of pleats, in other words is arranged in folds around the supporting pipe, the other end cap can be provided with a safety or bypass valve, and can allow the fluid current to bypass the filter element insofar as the mat filter no longer allows fluid penetration because it is completely clogged with pollutants.

In the filter element disclosed in DE 4312705 A1, the cylindrical filter casing which surrounds the mat filter is formed of an expanded metal fabric. The two ends of the casing are bent toward one another and inward to open in a retaining clip, which forms the foundation for a layer of adhesive. The adhesive in this case is a two-component adhesive. Because of the plurality of manufacturing stages and the accompanying structural components, the known filter element is costly to manufacture. Furthermore, there are maintenance problems with such filter elements when they become unusable, especially in relation to the expanded metal casing of metal fabric. Final maintenance of the filter element, for example when the filter element is to be processed as an entirety in a suitable shredder unit, is consequently not possible and limits the recycling capacity to individual components of the filter element.

GB-A-2,007,992 discloses a filter element having a filter casing formed from a flat blank. The blank ends are turned toward one another with formation of a filter chamber, and are tightly joined together by means of a sealing seam produced by a heat-sealing method. In order to attain tightly fitted contact of the mat filter with the interior supporting pipe and the cylindrical filter casing, so that even with the stresses of exchange the mat filter is supported securely in the filter element, a shrinking process is applied to the exterior cylindrical casing with exterior heat application. However, this application can lead to detrimental thermal stresses for the mat filter.

A filter element having an interior and/or exterior supporting pipe and frontal end caps is disclosed in GB-A-1,411,607. The supporting pipe is formed of a flat blank of plastic. The overlapping blank ends are bent toward and welded with one another with formation of a sealing seam. The filter material in the form of filter paper is rolled up, forming a hollow cylinder that can be inserted in the filter housing. In this case tolerances occur which interfere with a secure supporting of the mat filter. This construction reacts as sensitive to the stresses of exchange.

DE-A-19538185 discloses a filter element for gases or liquids with folded filter material arranged in the shape of a ring, penetrable from the exterior to the interior and arranged between an interior perforated cylindrical support body and an exterior perforated cylindrical casing. The cylindrical casing is produced by bending a perforated flat material. The material edges are subsequently connected with each other. For the production of this filter element, the perforated flat material in the form of a plastic strip is wound helically into the form of a cylinder. The helically running edges are attached to one another by a plastic sealing compound. Here too the ring of star-shaped folded filter material arranged between the interior cylindrical support body and the exterior cylindrical casing is arranged with some spacing, which in turn heightens the sensitivity in relation to stresses arising from exchanges.

SUMMARY OF THE INVENTION

Objects of the present invention are to provide a filter element which can be manufactured economically, increases the possibility of recycling for the filter element as an entirety, and is not sensitive to the stresses involved in exchanges of the filters.

The foregoing objects are basically obtained by a filter element comprising a fluid permeable supporting pipe, a mat filter surrounding the supporting pipe, and a plastic filter casing with opening enclosing the mat filter and delimiting a filter chamber. Two end caps are connected to the filter casing. The mat filter is folded into a cylinder which can be thrust open on the supporting pipe, and has a larger exterior diameter than the interior diameter of the filter casing. The mat filter is brought or extends inward at one of its frontal ends in such a manner that a cone is formed to facilitate its introduction into the cylindrical filter casing. An especially advantageous and economical manufacture of the filter element is attained in this matter. Furthermore, a tightly fitted construction of the mat filter within the filter element is obtained, so that the mat filter can be supported directly on the filter casing and on the supporting pipe and is supported in such a manner that it is not sensitive to the stresses involved in exchanges.

The plastic filter casing is formed of a flat blank, with its edges bent toward one another, defining a sealed filter chamber, and are tightly joined by a sealing seam. The sealing seam can be formed by heat sealing, a heating element or ultrasonic welding. The conventional longitudinal seam clasp for the formation of the sealing seam can be deleted. The high-cost folding back of the ends of the filter casing also need not be executed. The two-component adhesive need not be hardened in the trough-like receiving channel formed by the longitudinal seam clasp. By using a plastic casing as filter casing, and by suitable selection of the plastic material, without further difficulty this arrangement can be heat-sealed together or processed by an ultrasonic welding method. High resistance and stability of the transverse sealing seam is also guaranteed during subsequent operation. The plastic material being used as filter casing can later be disposed of and recycled without problem together with the entire filter element by shredding or the like.

With one especially preferred embodiment of the filter element of the invention the mat filter is pleated and comprises plastic materials. Formation of an additional filter fold and flush alignment of the mat ends one against the other can allow these ends to be tightly joined together with one another by means of an ultrasonic welding method. Since the ends of the filter casing are also connected with one another by means of an ultrasonic welding method, a large part of the relevant sealing for the filter element can be manufactured using such a manufacturing method, saving manufacturing costs.

Providing the mat filter in folds around the cylinder is particularly advantageous in the manufacture of the filter element. The mat filter can be thrust open on the supporting pipe, and provided with a larger exterior diameter than the interior diameter of the filter casing. Preferably, the mat filter is held together at one of its working ends by developing a cone-shape, simplifying its introduction into the cylindrical filter casing.

According to another especially preferred embodiment, all of the structural parts of the filter element are of plastic materials. This filter element can be recycled as an entirety in a shredder unit.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
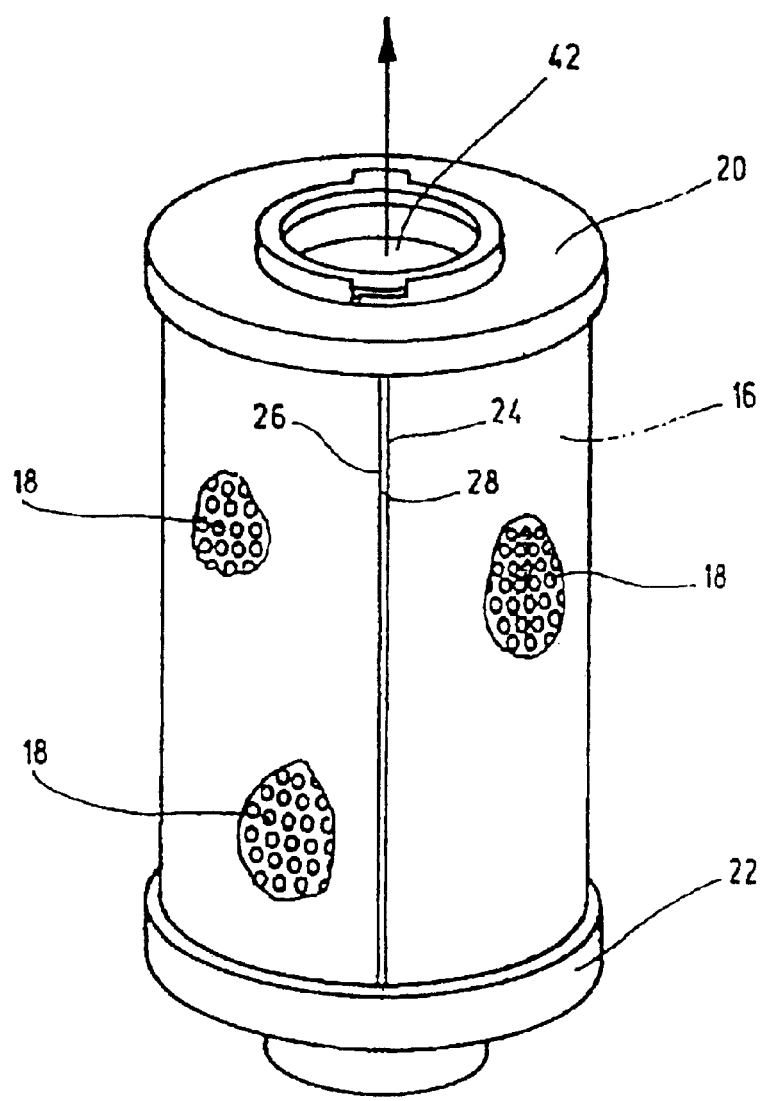
FIG. 1 is a side perspective view according to an embodiment of the present invention.

The filter element of FIG. 1 comprises a fluid-permeable supporting pipe 10 (cf. FIG. 5) surrounded by a mat filter 12, which in turn is enclosed by a filter casing 16 with openings 18 delimiting a filter chamber 14. The filter element has end caps 20,22 (cf. FIG. 1).

Supporting pipe 10 is formed of a cylindrical pipe segment and has circular openings for passage of the fluid. The longitudinal ends of supporting pipe 10 are joined together by means of a welding seam, not shown in greater detail.

Figure 3:
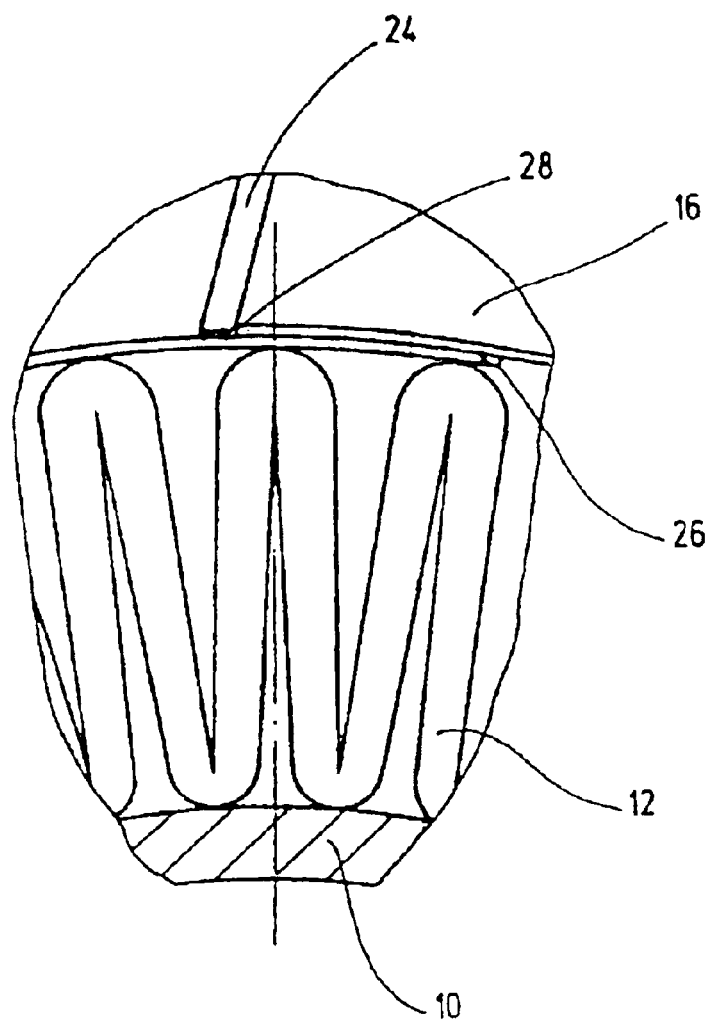
FIG. 3 is a partial perspective view of filter element according the present invention with a sealing seam between filter casing ends manufactured by ultrasonic welding.
Figure 4:
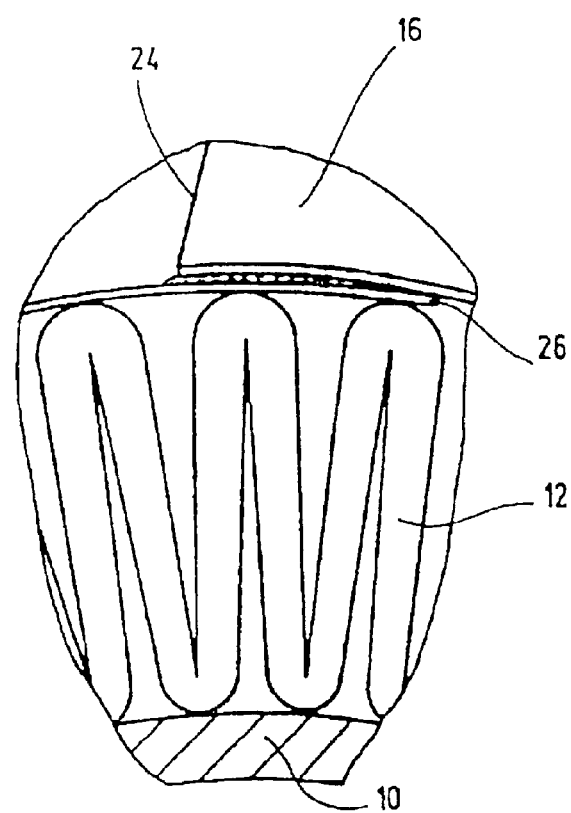
FIG. 4 is a partial perspective view of a filter element according to the present invention with a sealing seam between filter casing ends manufactured by heat sealing.

Supporting pipe 10 is open at the two frontal or axial ends. Filter casing 16 is formed of a plastic, especially of a polyamide or polyethylene compound, with good heat-adhesion properties and/or a good capacity for processing by ultrasonic welding. The plastic filter casing is first formed as a flat blank (not shown). The two ends 24, 26 of the blank are bent around toward one another, and are joined together securely with one another by a sealing seam 28 produced by the aforementioned methods, forming a filter chamber 14. Sealing seam 28 produced by the ultrasonic welding method is illustrated in FIG. 3. A hot melt sealing seam 28 produced according to the heat-sealing method is illustrated in FIG. 4. According to the illustrations of both FIGS. 3 and 4, an overlapping is developed in the area of the two ends 24 and 26 of the filter casing 16 in both cases. This is particularly important when the adhesive sealing (hot melt) produced for the heat-sealing method requires a more extensive contact surface to obtain a secure hold than does the sealing produced according to the ultrasonic welding method.

Figure 2:
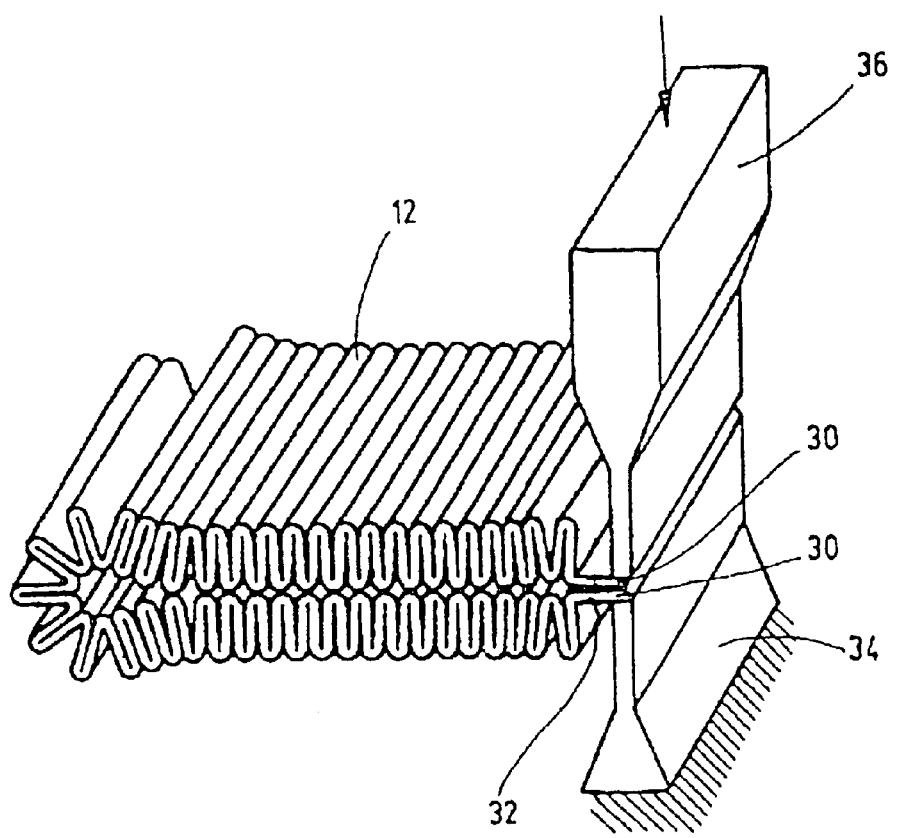
FIG. 2 is a perspective view illustrating one manufacturing step of a pleated mat filter element of FIG. 1.

As is shown especially in FIG. 2, mat filter 12 is pleated, in other words is folded, and displays the traditional plastic materials in a supporting fabric not shown in greater detail. The filter mat is suitable for the filtering of a fluid and consequently for the cleaning out of pollutants. To produce a mat filter 12 with a cylindrical interior diameter delimiting filter chamber 14, the two open ends or edges 30 engage against one another intermittently, forming an additional filter fold 32. Subsequently the ends 30 are tightly joined together with one another by an ultrasonic welding method. The bottom tool 34 is stationary; and the top tool 36 undertakes the delivery movement of the device in the direction shown by the arrow. Following conclusion of the welding process the two ends 30 of mat filter 12 are joined together securely with one another with formation of an additional filter fold 32. The strip-like individual filter folds 32 engaging on one another can be removed form one another and then form the hollow cylindrical filter chamber.

Figure 6:
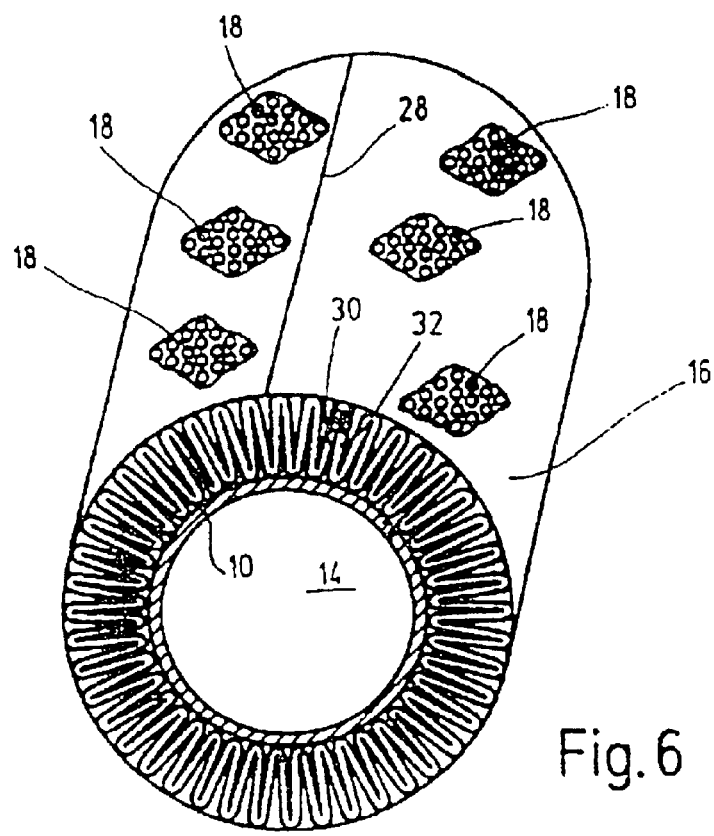
FIG. 6 is a end perspective view of the filter element of FIG. 1, without the end caps.
Figure 5:
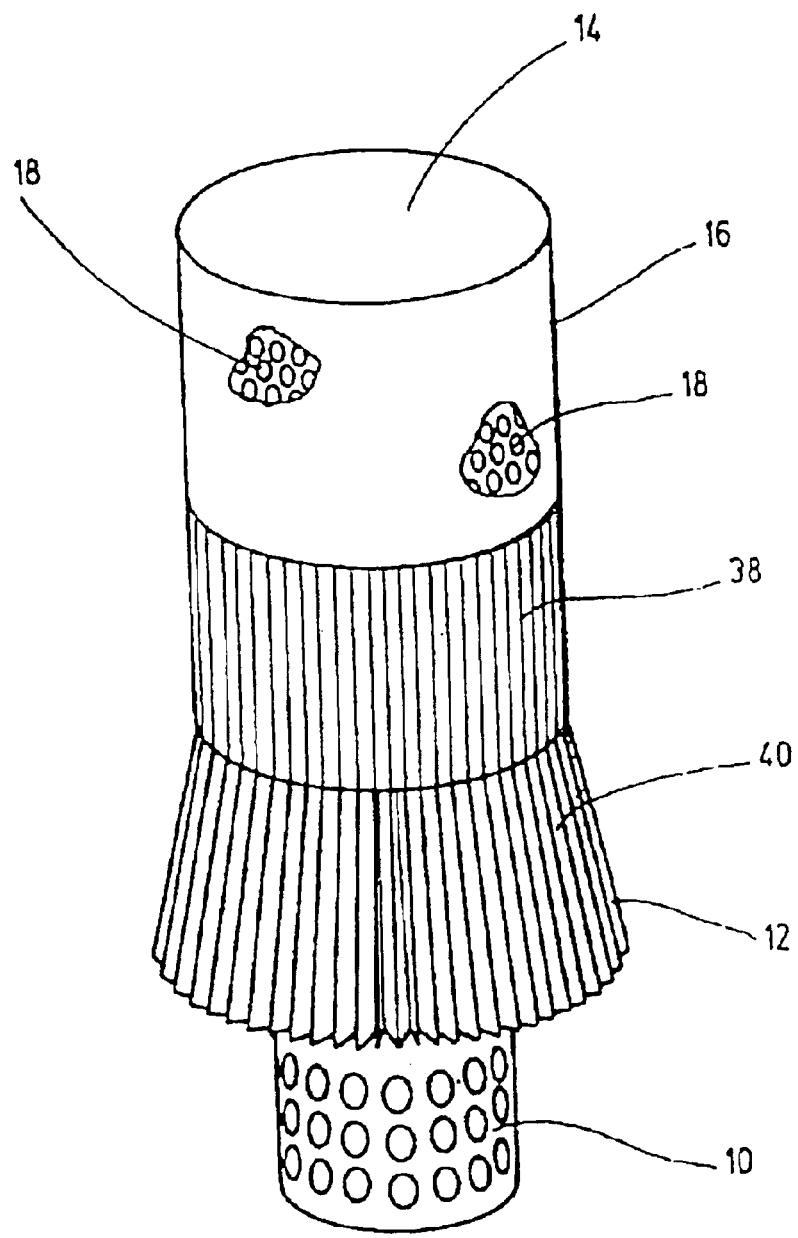
FIG. 5 is a composite, side perspective view of the filter element of FIG. 1 with a filter casing, filter mat and supporting pipe.

To attain a construction of the filter element as shown in FIG. 6, first an assembly of the individual component parts according to the representation of FIG. 5 is undertaken. First, mat filter 12 is folded on the cylinder, can be pushed open on supporting pipe 10, and can be provided with a larger exterior diameter than the interior diameter of the associated filter casing 16. Mat filter 12, as shown clearly in FIG. 5, is then brought or extends inward at its top frontal end 38 in such a manner that a cone 40 is formed. The cone facilitates the mat's introduction into cylindrical filter casing 16, and is canceled out as soon as mat filter 12 is introduced entirely into closed filter casing 16.

In order to guarantee a complete recycle capacity of the filter element, mat filter 12 and filter casing 16 are of a recyclable plastic material. Furthermore, the two end caps 20,22 are formed of a recyclable plastic material. Likewise, in expansion of this concept, supporting pipe 10 can also be of a recyclable plastic material. The openings 18 in plastic filter casing 16 are formed by punching out, and are in the shape of a circular cross section.

The polluted fluid passes through the filter element from the exterior to the interior in filter chamber 14. A cleaning out is performed with the fluid passage through pleated mat filter 12, which receives and holds the pollutants. The cleaned out fluid flows through the outlet opening 42 in top end cap 20 in the direction as shown in FIG. 1. With reference to the bottom end cap 22 shown in FIG. 1, a not shown bypass or safety valve can be mounted facing downward in an offset projection. For the production of sealing seam 28 of filter casing 16, this casing is stretched out on a cylindrical auxiliary tool and then processed from the outside with the ultrasonic welding tool, thus producing sealing seam 28.

Mat filter 12 can be designed for low pressure or high pressure. In either case, it can be of polyester or polyamide materials, as well as fiberglass paper. Beyond that, mat filters which can be cleared of pollutants are of wire fabric materials. The perforated material for filter casing 16 can have a hole dimension of 1.25 mm with hole spacings in feed direction of 1.9 mm and middle to middle spacing of 3.25 mm in horizontal alignment. Thus, an open surface of 38% is obtained for the fluid flow-through.

Instead of the ultrasonic welding tool indicated with reference 36 in FIG. 2, one heating element can be used which causes welding of the plastic material for mat filter 12. The heating element likewise can be used for the production of sealing seam 28.

The filter element described above can be produced economically because of its composition and is almost entirely recyclable. Of particular interest, insofar as the filter element is completely of plastic, it can be disposed of as an entirety in shredder units or the like.

While various embodiments have been chosen to illustrate the invention, it will be understood by those skilled in the art that various changes and modification can be made therein without departing from the scope of the invention as defined in the appended claims.

What is claimed is:

1. A method of assembling a filter element, comprising the steps of:

forming a plastic filter casing with openings from a flat blank with opposite ends thereof bent towards one another; and joining said opposite ends together by a sealing seam;

folding a resilient mat filter into a cylindrical shape, and pushing said mat filter open on a fluid-permeable supporting pipe to surround and engage said supporting pipe, said cylindrical shape of said mat filter having an exterior diameter prior to introduction into said casing larger than an interior diameter of said filter casing along an entire axial length of said mat filter;

forming one axial end of said mat filter into a conical shape to facilitate introduction therof into said filter casing;

after forming said one axial end into a conical shape, introducing said mat filter and said pipe into said filter casing delimiting a filter chamber; and connecting two end caps to said filter casing;

whereby, said mat filter is supported directly on said filter casing and said supporting pipe.

2. A method according to claim 1 wherein said ends of said filter casing are joined by a heat seal to form said sealing seam.

3. A method according to claim 1 wherein said ends of said filter casing are joined by a heating element to form said sealing seam.

4. A method according to claim 1 wherein said ends of said filter casing are joined by an ultrasonic weld to form said sealing seam.

5. A method according to claim 1 wherein said mat filter is pleated, comprises plastic material, and comprises an additional filter fold with a flush arrangement of mat filter edges on one another allowing said mat filter edges to be tightly joined.

6. A method according to claim 5 wherein said mat filter edges are joined by an ultrasonic weld.

7. A method according to claim 5 wherein said mat filter edges are joined by a heat seal.

8. A method according to claim 1 wherein said filter casing consists of recylable plastic material.

9. A method according to claim 8 wherein said end caps consist of recyclable plastic material.

10. A method according to claim 9 wherein said supporting pipe consists of recyclable plastic material.

11. A method according to claim 8 wherein said supporting pipe consists of recyclable plastic material.

12. A method according to claim 1 wherein said openings in said plastic filter casing are formed by punching out devices.

13. A method according to claim 12 wherein said openings are circular.

14. A method according to claim 1 wherein said sealing scam comprises intermittent contact points of said ends of said filter casing.

15. A method according to claim 1 wherein said sealing seam comprises an overlapping area of said ends of said filter casing.

16. A method according to claim 1 wherein prior to introduction onto said supporting pipe, said mat filter has an interior diameter less than an exterior diameter of said supporting pipe along an entire axial length of said mat filter.

* * * * *